(12) United States Patent
Yamamoto et al.

(10) Patent No.: US 10,788,075 B2
(45) Date of Patent: Sep. 29, 2020

(54) BALL BEARING

(71) Applicant: JTEKT CORPORATION, Osaka-shi, Osaka (JP)

(72) Inventors: Yuya Yamamoto, Osaka (JP); Yasuhiko Ishii, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 72 days.

(21) Appl. No.: 16/144,618

(22) Filed: Sep. 27, 2018

(65) Prior Publication Data

US 2019/0101158 A1 Apr. 4, 2019

(30) Foreign Application Priority Data

Oct. 4, 2017 (JP) ................. 2017-194354

(51) Int. Cl.
*F16C 33/41* (2006.01)
*F16C 33/58* (2006.01)
(Continued)

(52) U.S. Cl.
CPC .......... *F16C 33/583* (2013.01); *F16C 19/163* (2013.01); *F16C 33/585* (2013.01);
(Continued)

(58) Field of Classification Search
CPC ...... F16C 19/163; F16C 33/41; F16C 33/412; F16C 33/414; F16C 33/416; F16C 33/418;
(Continued)

(56) References Cited

U.S. PATENT DOCUMENTS 2,000,276 A * 5/1935 Delaval-Crow ........ F16C 33/80
384/488
3,350,148 A 10/1967 Sanguinetti et al.
(Continued)

FOREIGN PATENT DOCUMENTS

CN 1668858 A 9/2005
CN 102762880 A 10/2012
(Continued)

OTHER PUBLICATIONS

Jul. 30, 2019 Office Action issued in U.S. Appl. No. 15/928,189.
(Continued)

*Primary Examiner* — Phillip A Johnson
(74) *Attorney, Agent, or Firm* — Oliff PLC (57) ABSTRACT

A ball bearing includes an inner ring, an outer ring, and a cage that supports balls. At least one portion of each prong of the cage overlaps with an inner ring raceway surface in an axial direction and the entirety of the prongs do not overlap with a shoulder of the inner ring in the axial direction. A pocket of the cage overlaps with virtual conical planes that are parallel to a reference virtual conical plane including an inner ring nominal contact point and an outer ring nominal contact point, and that are part, on the other axial side, of both a virtual conical plane including an edge between the inner ring raceway surface and the shoulder of the inner ring and a virtual conical plane including an edge between the outer ring raceway surface and the outer ring counter-bored portion.

2 Claims, 5 Drawing Sheets (51) Int. Cl.
*F16C 33/80* (2006.01)
*F16C 19/16* (2006.01)
*F16C 33/66* (2006.01)
*F16C 33/78* (2006.01)

(52) U.S. Cl.
CPC ...... *F16C 33/6607* (2013.01); *F16C 33/7846* (2013.01); *F16C 33/80* (2013.01); *F16C 2240/34* (2013.01)

(58) Field of Classification Search
CPC .. F16C 33/6607; F16C 33/7846; F16C 33/80; F16C 33/583
See application file for complete search history.

(56) References Cited

U.S. PATENT DOCUMENTS

| | | | |
|---|---|---|---|
| 3,414,275 | A | 12/1968 | Takahashi |
| 4,243,276 | A | 1/1981 | Persson et al. |
| 4,324,444 | A | 4/1982 | Buczynski et al. |
| 4,505,484 | A | 3/1985 | Ohkuma et al. |
| 4,557,612 | A | 12/1985 | Neal |
| 4,655,617 | A | 4/1987 | Yasui et al. |
| 4,874,073 | A | 10/1989 | Tagawa |
| 5,558,448 | A | 9/1996 | Yabe et al. |
| RE36,804 | E | 8/2000 | Kajihara et al. |
| 6,709,161 | B2 | 3/2004 | Yakura et al. |
| 7,029,181 | B2 | 4/2006 | Terada et al. |
| 7,547,146 | B2 | 6/2009 | Kinno et al. |
| 8,523,449 | B2 | 9/2013 | Hamada et al. |
| 8,876,395 | B2 | 11/2014 | Sakaguchi |
| 9,500,232 | B2 | 11/2016 | Ishii |
| 9,951,813 | B2 | 4/2018 | Taniguchi et al. |
| 2006/0088235 | A1 | 4/2006 | Ueda |
| 2007/0154124 | A1 | 7/2007 | Inoue et al. |
| 2011/0002568 | A1 | 1/2011 | Kawamura et al. |
| 2011/0142388 | A1 | 6/2011 | Maejima et al. |
| 2012/0301065 | A1 | 11/2012 | Mori et al. |
| 2012/0308172 | A1 | 12/2012 | Shaikh |
| 2016/0053810 | A1 | 2/2016 | Ishii et al. |
| 2017/0204908 | A1 | 7/2017 | Ishii et al. |

FOREIGN PATENT DOCUMENTS

| | | | | |
|---|---|---|---|---|
| DE | 102009009633 | A1 | 8/2010 | |
| FR | 1351942 | A | 2/1964 | |
| FR | 2308013 | A1 | 11/1976 | |
| FR | 3001512 | A1 | 8/2014 | |
| JP | 2004-068924 | A | 3/2004 | |
| JP | 2004-100917 | A | 4/2004 | |
| JP | 2004-211862 | A | 7/2004 | |
| JP | 2004-239293 | A | 8/2004 | |
| JP | 2004-293563 | A | 10/2004 | |
| JP | 2005-076660 | A | 3/2005 | |
| JP | 2005-233248 | A | 9/2005 | |
| JP | 2007016822 | A * | 1/2007 | ............ F16C 33/782 |
| JP | 2007-112920 | A | 5/2007 | |
| JP | 2009-236142 | A | 10/2009 | |
| JP | 2010-19268 | A | 1/2010 | |
| JP | 2010-048326 | A | 3/2010 | |
| JP | 2010-048328 | A | 3/2010 | |
| JP | 2010-164122 | A | 7/2010 | |
| JP | 2011043214 | A | 3/2011 | |
| JP | 2011-208662 | A | 10/2011 | |
| JP | 2012-036990 | A | 2/2012 | |
| JP | 2012-184814 | A | 9/2012 | |
| JP | 5636819 | B2 | 12/2014 | |
| JP | 2015-086940 | A | 5/2015 | |
| JP | 2016-023647 | A | 2/2016 | |
| JP | 2016-223598 | A | 12/2016 | |
| JP | 2017-009016 | A | 1/2017 | |
| JP | 2017133569 | A * | 8/2017 | ............ F16C 33/583 |
| JP | 6508196 | B2 * | 5/2019 | ............ F16C 19/163 |
| WO | 2004/007983 | A1 | 1/2004 | |
| WO | 2016/010057 | A1 | 1/2016 | |
| WO | 2016/083133 | A1 | 6/2016 | |

OTHER PUBLICATIONS

Jan. 10, 2018 Office Action issued in U.S. Appl. No. 15/408,721.
Sep. 17, 2018 Office Action issued in U.S. Appl. No. 16/053,179.
Aug. 30, 2016 International Search Report issued in International Patent Application No. PCT/JP2016/066287.
Aug. 30, 2016 Written Opinion issued in International Patent Application No. PCT/JP2016/066287.
Sep. 20, 2018 Office Action issued in U.S. Appl. No. 15/919,936.
Jul. 31, 2018 Notice of Allowance issued in U.S. Appl. No. 15/408,721.
U.S. Appl. No. 15/408,721, filed Jan. 18, 2017 in the name of Ishii et al.
U.S. Appl. No. 16/053,179, filed Aug. 2, 2018 in the name of Ishii et al.
U.S. Appl. No. 15/919,936, filed Mar. 13, 2018 in the name of Ishii et al.
U.S. Appl. No. 15/928,189, filed Mar. 22, 2018 in the name of Ishii et al.
U.S. Appl. No. 15/578,482, filed Nov. 30, 2017 in the name of Ishii et al.
Jun. 28, 2018 Notice of Allowance issued in U.S. Appl. No. 15/578,482.
Jan. 2, 2019 Office Action issued in Chinese Patent Application No. 201680032114.1.
Jan. 22, 2019 Office Action issued in U.S. Appl. No. 15/928,189.

* cited by examiner

FIG.1

ONE AXIAL SIDE    OTHER AXIAL SIDE

ONE AXIAL SIDE          OTHER AXIAL SIDE

--PRIOR ART--

BALL BEARING

INCORPORATION BY REFERENCE

The disclosure of Japanese Patent Application No. 2017-194354 filed on Oct. 4, 2017 including the specification, drawings and abstract, is incorporated herein by reference in its entirety.

BACKGROUND OF THE INVENTION

1. Field of the Invention

The invention relates to a ball bearing.

2. Description of the Related Art

Figure 5:
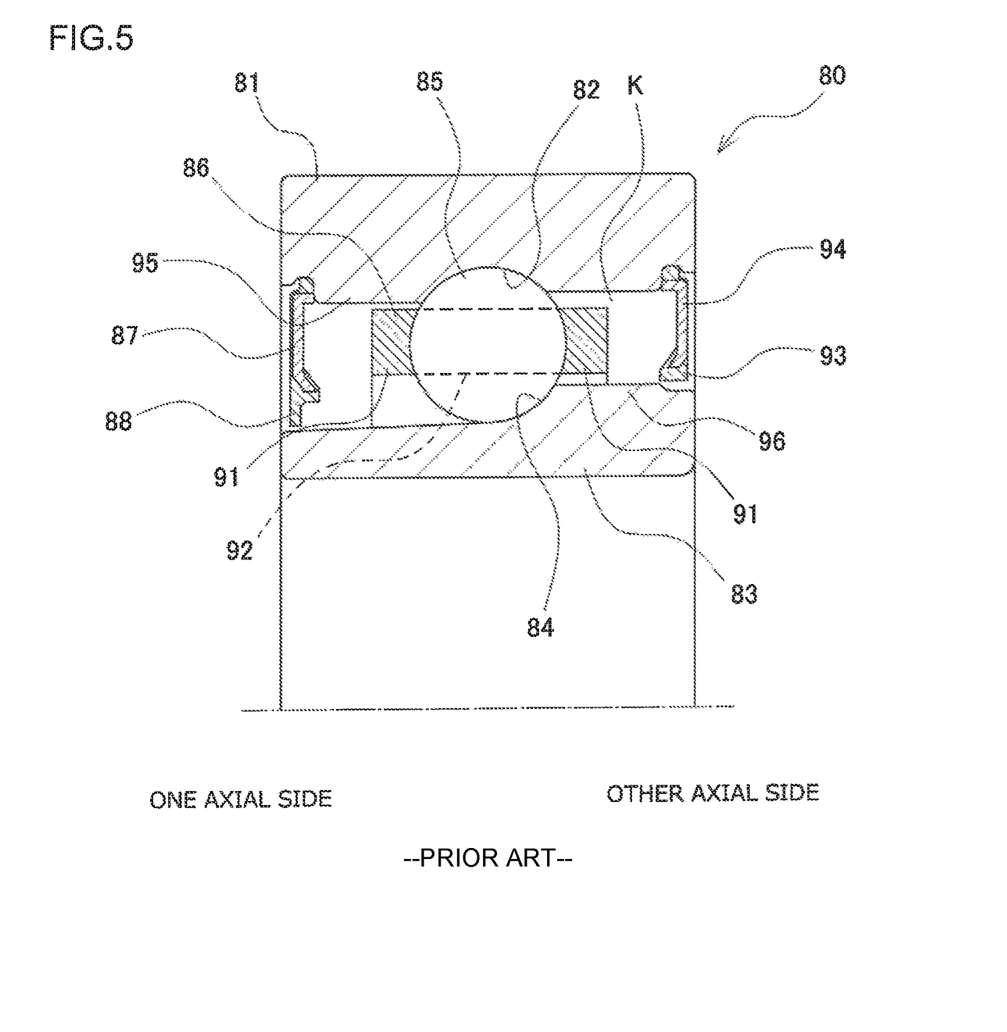
FIG. 5 is axial sectional view of a conventional ball bearing.

In recent years, there are cases in which apparatuses having a rotational axis that rotates at high speed are used for automobiles. In a rolling bearing that supports such a rotational axis, a rotational speed of an inner ring is higher than that of an outer ring. When the rolling bearing supports the rotational axis, an angular contact ball bearing 80 as shown in FIG. 5 may be used as the rolling bearing. In the ball bearing 80, an outer ring 81 and an inner ring 83 are combined co-axially. An outer ring raceway surface 82 is formed on an inner periphery of the outer ring 81. An inner ring raceway surface 84 is formed on an outer periphery of the inner ring 83. A plurality of balls 85 is rollably disposed between the outer ring raceway surface 82 and the inner ring raceway surface 84. The balls 85 are held by a cage 86 so as to be arranged at prescribed intervals in a circumferential direction. On the outer ring 81, a shoulder 95 that supports the balls 85 is formed on one axial side of the outer ring raceway surface 82. On the inner ring 83, a shoulder 96 that supports the balls 85 is formed on the other axial side of the inner ring raceway surface 84. The ball bearing 80 supports radial load and axial load with the shoulder 95 of the outer ring 81, the shoulder 96 of the inner ring 83, and the balls 85.

An annular space K between the inner ring 83 and the outer ring 81 is sealed with grease. The grease lubricates the raceway surfaces 82, 84, the balls 85, and the cage 86. Sealing devices 87, 94 are provided on opening portions of the annular space K on both axial sides. Outer peripheries of the sealing devices 87, 94 are fitted to the inner periphery of the outer ring 81 with a fitting margin. Lips 88, 93 are provided on inner peripheries of the sealing devices 87, 94. The lips 88, 93 face the outer periphery of the inner ring 83 in the radial direction to suppress an intrusion of a foreign substance from outside (see Japanese Patent Application Publication No. 2015-86940 (JP 2015-86940 A)).

In the inner ring 83 of the ball bearing 80, an outer diameter dimension of the other axial side portion of the inner ring 83 in which the shoulder 96 is formed is larger than that of the other axial side portion of the inner ring 83 which has no shoulder. Thus, when the ball bearing 80 rotates, the grease sealed in the annular space K flows from a small radial side (one side in FIG. 5) to a large radial side (the other side in FIG. 5) of the inner ring 83, due to centrifugal force. As a result, there is a possibility that the flowing grease leaks from a clearance between the sealing device 94 attached on the other axial side and the inner ring 83. In the ball bearing 80 that rotates at high speed in particular, the balls 85 and the cage 86 rotate at high speed. Thus, the grease is sheared to be softened, which makes the grease flow easily. Thus, the grease leaks more easily.

If the grease leaks from the annular space K, the service life of the bearing may decrease since the amount of grease sealed in the annular space K decreases. Additionally, there is a possibility that the usage environment will deteriorate due to the scattered grease sticking to peripheral devices.

SUMMARY OF THE INVENTION

One object of the invention is to suppress grease from softening to suppress the grease from leaking in an angular contact ball bearing used for high-speed rotation.

According to an aspect of the invention, the ball bearing includes: an inner ring that has, on an outer periphery, an inner ring raceway surface, an inner ring stepped portion that is positioned on one axial side of the inner ring raceway surface and that does not have a shoulder, and a shoulder positioned on the other axial side of the inner ring raceway surface; an outer ring that has, on an inner periphery, an outer ring raceway surface, a shoulder positioned on the one axial side of the outer ring raceway surface, and an outer ring counter-bored portion that is positioned on the other axial side of the outer ring raceway surface and that does not have a shoulder; a plurality of balls rollably disposed between the inner ring raceway surface and the outer ring raceway surface; a cage that has an annular body disposed on the one axial side of the balls, a plurality of prongs disposed on the other axial side of the annular body, and a pocket that is surrounded by two adjacent prongs and the annular body and that houses one of the balls; a first sealing member that is fixed to the one axial side of the shoulder of the outer ring while facing the inner ring in a contact or a non-contact manner at a position on the one axial side of the inner ring stepped portion and/or a position offset to the one axial side from the inner ring stepped portion, and that defines a space surrounded by the outer ring and the inner ring in the radial direction from an outside space on the one axial side; and a second sealing member that is fixed to the other axial side of the outer ring counter-bored portion while facing the inner ring in a contact or a non-contact manner at a position on the other axial side of the shoulder of the inner ring and/or a position offset to the other axial side from the shoulder of the inner ring, and that defines a space surrounded by the outer ring and the inner ring in the radial direction from an outside space on the other axial side, wherein an inner ring nominal contact point, in which the inner ring raceway surface and the balls are in contact, is positioned offset to the other axial side from an outer ring nominal contact point, in which the outer ring raceway surface and the balls are in contact, at least one portion of each of the prongs overlaps with the inner ring raceway surface in the axial direction while the entirety of each of the prongs does not overlap with the shoulder of the inner ring in the axial direction, and the pocket overlaps with virtual conical planes that are parallel to a reference virtual conical plane including the inner ring nominal contact point and the outer ring nominal contact point, and that are part, on the other axial side, of both a virtual conical plane including an edge between the inner ring raceway surface and the shoulder of the inner ring and a virtual conical plane including an edge between the outer ring raceway surface and the outer ring counter-bored portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
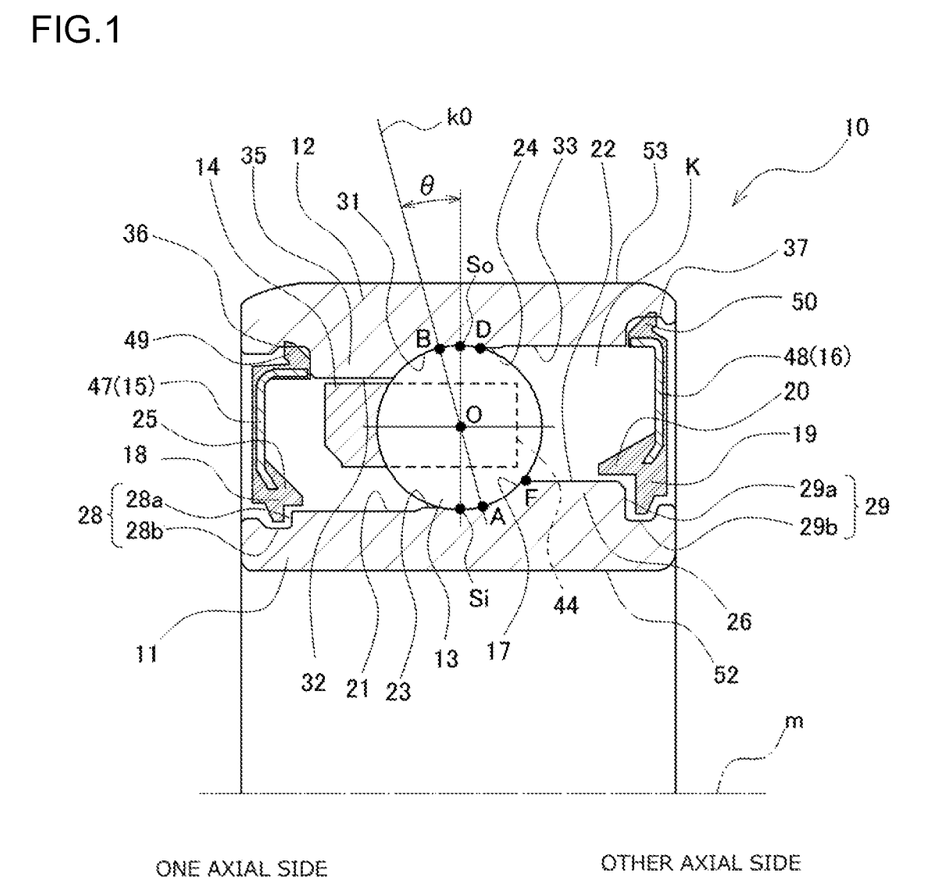
FIG. 1 is an axial sectional view of a ball bearing of the first embodiment.

A first embodiment of the invention will be described with reference to the drawings. FIG. 1 is an axial sectional view of a ball bearing 10 of the first embodiment. The ball bearing 10 is an angular contact ball bearing. The ball bearing 10 is used under high-speed rotation conditions. Specifically, the ball bearing 10 is used at a rotation speed in which a dmN value is around 1.5 million. The ball bearing 10 includes an inner ring 11, an outer ring 12, a plurality of balls 13, a cage 14, a first sealing device 15 serving as a first sealing member, and a second sealing device 16 serving as a second sealing member. The inner ring 11 and the outer ring 12 are annular and are combined co-axially. The inner ring 11 is disposed inside the outer ring 12 so as to be rotatable with respect to the outer ring 12 around a bearing axis m. For the convenience of description, a direction in which the bearing axis m extends is an axial direction in the following description. In FIG. 1, a left side of the axial direction is one axial side and a right side of the axial direction is the other axial side. A direction orthogonal to the bearing axis m is a radial direction. A direction of going around the bearing axis m is a circumferential direction.

In the inner ring 11, an inner periphery is a cylindrical surface 52 which is annularly formed with the bearing axis m as its center. In the inner ring 11, an inner ring raceway surface 17 is annularly formed with the bearing axis m as its center, generally at the center of an outer periphery in the axial direction. In the inner ring 11, a first outer peripheral surface 21 is formed on the one axial side of the inner ring raceway surface 17 of the outer periphery. In the inner ring 11, a second outer peripheral surface 22 is formed on the other axial side of the inner ring raceway surface 17 of the outer periphery. In an axial section, the inner ring raceway surface 17 has an arc-shape and a groove radius of the inner ring raceway surface 17 is slightly larger than half of a diameter of the ball 13. A point of the inner ring raceway surface 17, at which a dimension in the radial direction is the smallest, is an "inner ring raceway bottom" and is indicated by a point Si in FIG. 1. The first outer peripheral surface 21 is annularly formed with the bearing axis m as its center. An outer diameter of the first outer peripheral surface 21 is generally the same as a diameter of the inner ring raceway bottom Si. A retaining portion 23 is formed in a portion on the other axial side of the first outer peripheral surface 21, which is connected to the inner ring raceway surface 17. The retaining portion 23 has a slightly larger diameter than that of the inner ring raceway bottom Si so that the balls 13 do not easily fall out of the inner ring 11 when the ball bearing 10 is assembled. The second outer peripheral surface 22 is annularly formed with the bearing axis m as its center. An outer diameter of the second outer peripheral surface 22 is larger than that of the first outer peripheral surface 21. An edge at which the second outer peripheral surface 22 and the inner ring raceway surface 17 are connected is indicated by a point F in FIG. 1.

A shoulder 26 that has a larger diameter than that of the inner ring raceway bottom Si is formed on the other axial side of the inner ring raceway surface 17. The shoulder 26 can support the balls 13 in the axial direction. In order to distinguish from a shoulder 35 of the outer ring 12 described below, the shoulder of the inner ring 11 will be referred to as an inner ring shoulder 26. In contrast, on the one axial side of the inner ring raceway surface 17, a shoulder is not formed and thus, the balls 13 cannot be supported in the axial direction. The portion on which the first outer peripheral surface 21 is formed and the retaining portion 23 define an "inner ring stepped portion".

A first lip groove 28 in which a lip 18 of the first sealing device 15 is placed is formed on the one axial side of the first outer peripheral surface 21. A second lip groove 29 in which a lip 19 of the second sealing device 16 is placed is formed on the other axial side of the second outer peripheral surface 22.

In the outer ring 12, an outer periphery is a cylindrical surface 53 which is annularly formed with the bearing axis m as its center. In the outer ring 12, an outer ring raceway surface 31 is annularly formed generally at the center of the inner periphery in the axial direction with the bearing axis m as its center. In the outer ring 12, a first inner peripheral surface 32 is formed on the one axial side of the outer ring raceway surface 31 of the inner periphery. In the outer ring 12, a second inner peripheral surface 33 is formed on the other axial side of the outer ring raceway surface 31 of the inner periphery. In an axial section, the outer ring raceway surface 31 has an arc-shape and a groove radius of the outer ring raceway surface 31 is slightly larger than half of the diameter of the ball 13. A point of the outer ring raceway surface 31, at which a dimension in the radial direction is the largest, is an "outer ring raceway bottom" and is indicated by a point So in FIG. 1. The second inner peripheral surface 33 is annularly formed with the bearing axis m as its center. An inner diameter of the second inner peripheral surface 33 is almost the same as the diameter of the outer ring raceway bottom So. A retaining portion 24 is formed on a portion on the one axial side of the second inner peripheral surface 33, which connects to the outer ring raceway surface 31. The retaining portion 24 has a diameter slightly smaller than that of the outer ring raceway bottom So so that the balls 13 do not easily fall out of the outer ring 12 when the ball bearing 10 is assembled. An edge at which the retaining portion 24 and the outer ring raceway surface 31 are connected is indicated by a point D in FIG. 1.

The first inner peripheral surface 32 is annularly formed with the bearing axis m as its center. The inner diameter of the first inner peripheral surface 32 is smaller than that of the second inner peripheral surface 33. Thus, a shoulder with a smaller diameter than that of the outer ring raceway bottom So (hereinafter referred to as an outer ring counter-bored portion 35) is formed on the one axial side of the outer ring raceway surface 31. The outer ring counter-bored portion 35 can support the balls 13 in the axial direction. In contrast, on the other axial side of the outer ring raceway surface 31, a shoulder is not formed and thus, the balls 13 cannot be supported in the axial direction. A portion on which the second inner peripheral surface 33 is formed and the retaining portion 24 define an "outer ring counter-bored portion".

A first fixing groove 36 that fixes the first sealing device 15 is formed on the inner periphery of the outer ring 12 nearer to the one axial side than the first inner peripheral surface 32. A second fixing groove 37 that fixes the second sealing device 16 is formed on the inner periphery of the outer ring 12 nearer to the other axial side than the second inner peripheral surface 33.

Figure 2:
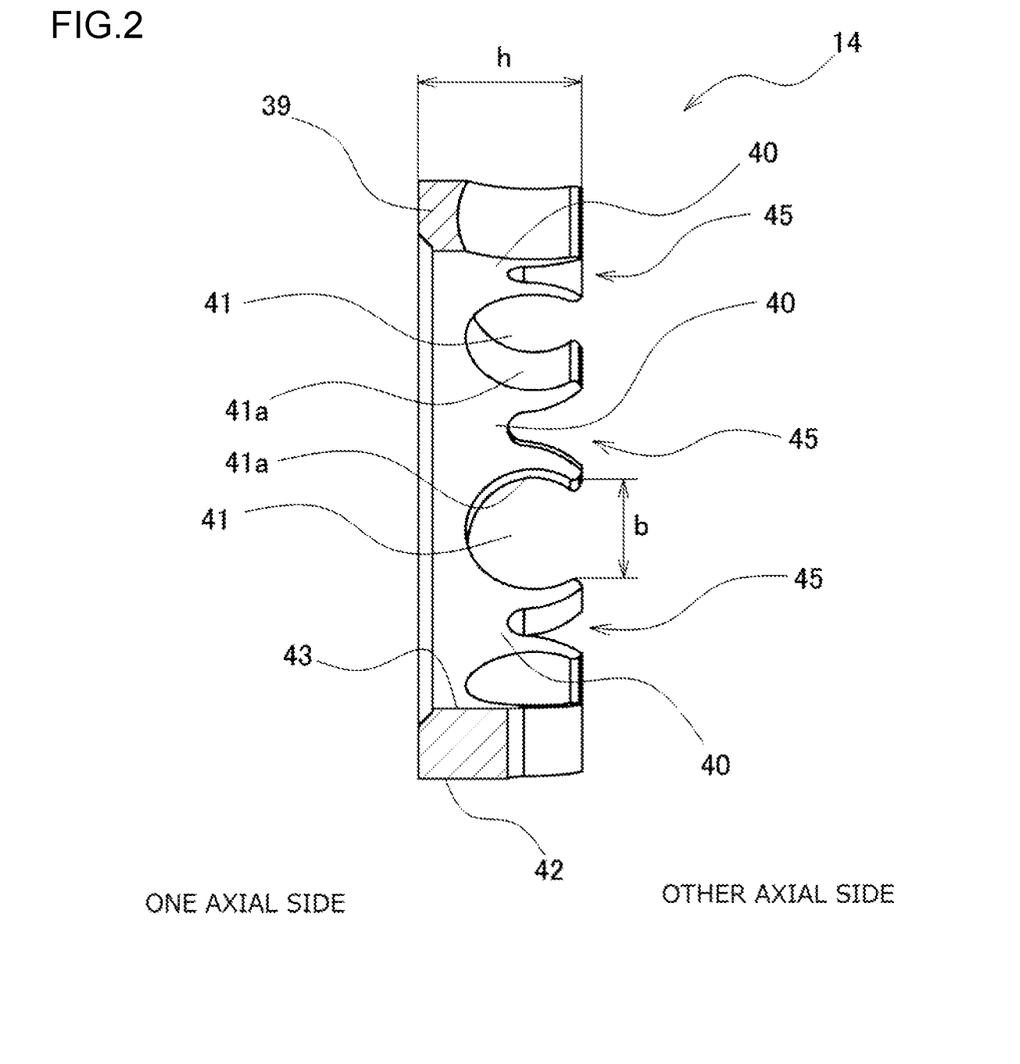
FIG. 2 is an axial sectional view of a cage.

The configuration of the cage 14 will be described with reference to FIG. 2. The cage 14 is annular as a whole. FIG. 2 is an axial sectional view of the cage 14. As a whole, the cage 14 has a configuration in which the configuration in FIG. 2 is annularly connected. The cage 14 is formed by subjecting a synthetic resin such as polyamide (PA), polyphenylene sulfide (PPS), and polyether ether ketone (PEEK) to injection molding.

The cage 14 has an annular body 39 that continues in the circumferential direction and a plurality of "prongs" 40 that protrudes from the annular body 39 toward the other axial side. A space surrounded by two prongs 40 next to each other in the circumferential direction and the annular body 39 is a "pocket" 41. One ball 13 is inserted in each of the pockets 41. An inner peripheral surface 41a of the pocket 41 is a portion of a single spherical surface. A diameter of the spherical surface is slightly larger than that of the outer diameter of the ball 13 and the ball 13 can be rotatably housed in the pocket 41. The outer peripheral surface 42 and the inner peripheral surface 43 of the cage 14 have a cylindrical shape in which a center coincides with the central axis of the cage 14 and the shape of each prong 40 viewed in the circumferential direction is a generally rectangular shape. An end portion 44 of the prong 40 (see FIG. 1) on the other axial side is formed to extend in a direction orthogonal to the bearing axis m.

A clearance b between end portions of the two prongs 40 that are next to each other in the circumferential direction with the pocket 41 therebetween is smaller than the diameter dimension of the ball 13. Thus, the ball 13 is prevented from easily coming out of the pocket 41. On the other axial side, the prong 40 has a cut portion 45 that is depressed in the axial direction. Since the end portion of the prong 40 has the cut portion 45, the end portion can deflect in the circumferential direction and thus, contain the ball 13 in the pocket 41. By appropriately selecting a length h of the prongs 40 of the cage 14 in the axial direction, leakage of the grease is suppressed in the ball bearing 10. Since the length h of the prongs 40 is related to a direction in which the ball 13 rotates, the details thereof will be described after the configuration of each component has been described.

As shown in FIG. 1, in the ball bearing 10, the inner ring 11 and the outer ring 12 are combined co-axially and the balls 13 are rollably contained between the inner ring raceway surface 17 and the outer ring raceway surface 31. The balls 13 are held at equal intervals in the circumferential direction by being inserted in the pockets 41 of the cage 14.

The ball 13 and the inner ring raceway surface 17 are in contact at an "inner ring nominal contact point A" that is at a position offset to the other axial side from the inner ring raceway bottom Si. The ball 13 and the outer ring raceway surface 31 are in contact at an "outer ring nominal contact point B" that is at a position offset to the one axial side from the outer ring raceway bottom So. That is, in the ball bearing 10, the inner ring nominal contact point A is positioned nearer to the other axial side than the outer ring nominal contact point B. The inner ring nominal contact point A is on the opposite side of a center O of the ball 13 from the outer ring nominal contact point B. A line k0 that connects the inner ring nominal contact point A and the outer ring nominal contact point B is inclined at an angle θ to a straight line extending in the radial direction. In this way, the inner ring nominal contact point A of the ball 13 and the outer ring nominal contact point B of the ball 13 are positioned on a single conical plane in which the bearing axis m is its center. The conical plane is a "reference virtual conical plane". Strictly speaking, the ball 13 and the raceway surfaces 17, 31 come in contact at a region (contact region) that has a prescribed expanse, such as an oval shaped region due to the contact surface being elastically deformed. In this description, the inner ring nominal contact point A and the outer ring nominal contact point B are both nominal contact points and are the center of each contact region. The angle θ formed of the straight line k0 and the straight line extending in the radial direction is a contact angle. In the ball bearing 10, the contact angle is about 15 degrees.

An annular space surrounded in the radial direction by the inner periphery of the outer ring 12 and the outer periphery of the inner ring 11 (hereinafter referred to as an "annular space K") is sealed with the grease. The grease lubricates the raceway surfaces 17, 31, the balls 13, and the cage 14. Channeling-type grease such as urea grease is preferably used as the sealed grease. The first sealing device 15 and the second sealing device 16 are assembled to opening portions on both axial sides of the annular space K.

The first sealing device 15 includes a core metal 47 formed of a steel plate and an elastic body. An outer periphery end portion of the core metal 47 is bent at a right angle and the axial section of the core metal 47 has a generally L-shape. The elastic body is formed into a prescribed shape by vulcanizing and molding a material such as nitrile rubber, super nitrile rubber, and flourorubber etc. using a mold. The core metal 47 is inserted in the mold and the material is vulcanized in the mold and thus, the elastic body is formed integrally with the core metal 47. In the elastic body, a fixed portion 49 is formed radially outward of the core metal 47. The outer diameter of the fixed portion 49 is larger than that of the inner diameter of the first fixing groove 36. The fixed portion 49 is fitted to the first fixing groove 36 and thus, the first sealing device 15 is fixed to the outer ring 12. In the elastic body, the lip 18 is formed radially inward of the core metal 47. The lip 18 protrudes radially inward towards the first lip groove 28 and faces a side surface 28a of the first lip groove 28 in the axial direction while facing a groove bottom surface 28b in the radial direction. Additionally, a portion of the lip 18 protrudes toward the other axial side to form a sub-lip 25. The sub-lip 25 faces the first outer peripheral surface 21 in the radial direction. The lip 18 faces the first lip groove 28 and the first outer peripheral surface 21 with a slight clearance therebetween to form a labyrinth and thus, suppresses entry of foreign matter into the annular space K.

In this way, the first sealing device 15 is fixed to the one axial side of the outer ring counter-bored portion 35. The first sealing device 15 faces the inner ring 11 in a non-contact manner at a position on the one axial side of the inner ring stepped portion to define the annular space K from an outside space on the one axial side.

The second sealing device 16 includes a core metal 48 formed of a steel plate and an elastic body. An outer periphery end portion of the core metal 48 is bent at a right angle and the axial section of the core metal 48 has a generally L-shape. As with the first sealing device 15, the elastic body is formed integrally with the core metal 48. The material of the elastic body is the same as the first sealing device 15. In the elastic body, a fixed portion 50 is formed radially outward of the core metal 48. The outer diameter of the fixed portion 50 is larger than that of the inner diameter of the second fixing groove 37. The fixed portion 50 is fitted to the second fixing groove 37 and thus, the second sealing device 16 is fixed to the outer ring 12. In the elastic body, the lip 19 is formed radially inward of the core metal 48. The lip 19 protrudes radially inward towards the second lip groove 29 and faces a side surface 29a of the second lip groove 29 in the axial direction while facing a groove bottom surface 29b in the radial direction. Additionally, a portion of the lip 19 protrudes toward the one axial side to form a sub-lip 20. The sub-lip 20 faces the second outer peripheral surface 22 in the radial direction. The lip 19 faces the second lip groove 29 and the second outer peripheral surface 22 with a slight clearance therebetween to form a labyrinth and thus, suppresses entry of foreign matter into the annular space K.

In this way, the second sealing device 16 is fixed to the other axial side of the outer ring counter-bored portion. The second sealing device 16 faces the inner ring 11 in a non-contact manner at a position on the other axial side of the inner ring shoulder 26 to define the annular space K from an outside space on the other axial side. In the ball bearing 10, the lips 18, 19 are not in contact with the inner ring 11 and thus, friction resistance of the lips 18, 19 can be reduced. Therefore, generation of heat can be prevented and the ball bearing 10 can be used at a higher speed.

Figure 3A:
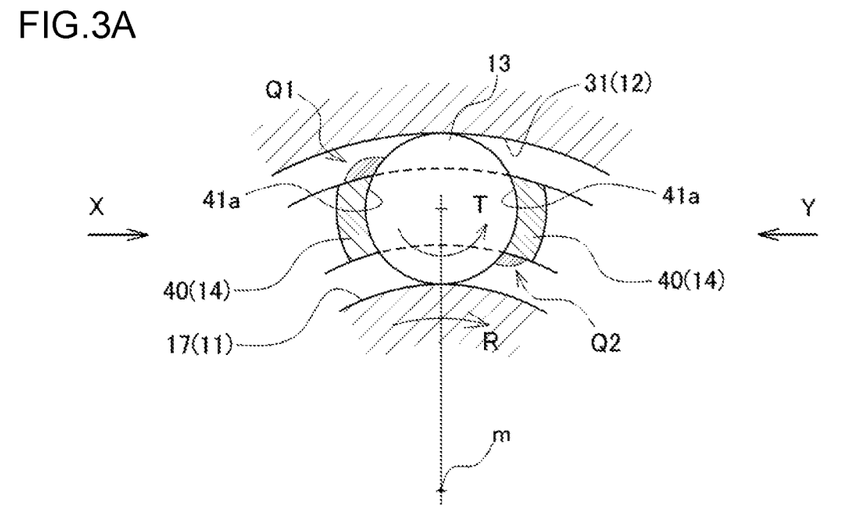
FIG. 3A, 3B, 3C are explanatory views that explain the movement of grease.
Figure 3B:
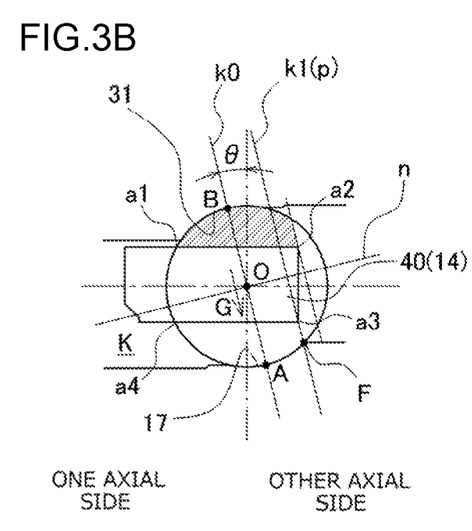
Figure 3C:
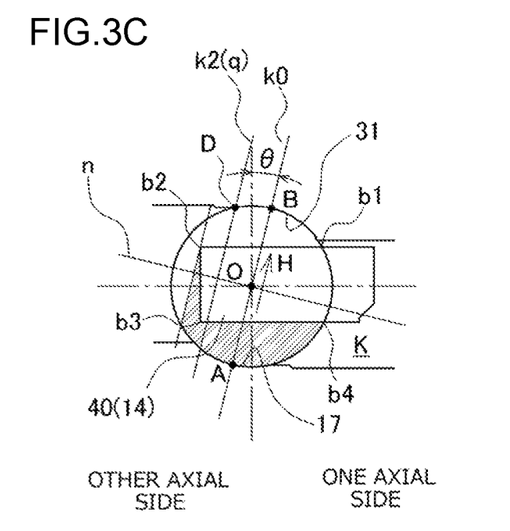

Effects of suppressing leakage of the grease of the ball bearing 10 will be described in detail with reference to FIG. 1 and FIGS. 3A, 3B, and 3C. FIG. 3A is a schematic diagram of one of the balls 13 of the ball bearing 10 when viewed in the axial direction. FIG. 3B is a schematic diagram of the ball 13 shown in FIG. 3A when viewed from the left side of the figure (in a direction indicated by an arrow X). FIG. 3C is a schematic diagram of the ball 13 shown in FIG. 3A when viewed from the right side of the figure (in a direction indicated by an arrow Y). Here, the case in which the inner ring 11 rotates in a direction indicated by an arrow R in FIG. 3A will be described.

The description will be provided with reference to FIG. 3A. When the inner ring 11 rotates in the direction of the arrow R, the ball 13 rotates in a counter-clockwise direction as indicated by an arrow T while also revolving around the bearing axis m in the direction of the arrow R. The ball 13 is housed in the pocket 41 of the cage 14. The ball 13 and the cage 14 are integrated to rotate around the bearing axis m in the direction of the arrow R.

As shown in FIGS. 3B and 3C, the ball 13 is in contact with the raceway surfaces 17, 31 in the direction of the straight line k0 inclined at just the contact angle θ to the straight line of the radial direction. Thus, the ball 13 rotates with a straight line n as its axis, in which the straight line n is orthogonal to the straight line k0 and connects the ball center O and a point along the bearing axis m. In FIG. 3B, a surface of the ball 13 moves in a direction of an arrow G and in FIG. 3C, the surface of the ball 13 moves in a direction of an arrow H.

When assembling the ball bearing 10, mainly a space between the ball 13 and the ball 13 in the circumferential direction is sealed with the grease. When the ball bearing 10 rotates, the grease sticks to surfaces of the ball 13 and the cage 14 and moves within the annular space K. Thus, the grease stuck to the ball 13 moves in the direction of the arrow G in FIG. 3B and moves in the direction of the arrow H in FIG. 3C.

The inner peripheral surface 41a of the pocket 41 of the cage 14 is near the surface of the ball 13. Thus, as shown in FIG. 3B, when viewed in the direction of the arrow X, the grease in a region in which hatching is applied, of the grease stuck to the surface of the ball 13, is scraped off in an upper portion of the prong 40 of the cage 14, that is, in regions a1 to a2. In the FIG. 3A, the state of grease Q1 scraped off in the upper portion of the prong 40 is schematically shown.

In the ball bearing 10 of the first embodiment, a position of a2 that is an end portion of the prong 40 on the other axial side is positioned to be nearer to the other axial side than a straight line k1 that passes through a point F (an edge at which the second outer peripheral surface 22 connects to the inner ring raceway surface 17) and that is parallel to the straight line k0. Thus, in a moving direction of the surface of the ball 13, the inner ring raceway surface 17 is always positioned rearward of the prong 40 of the cage 14. Therefore, it is possible to suppress the grease stuck to the surface of the ball 13 from entering the inner ring raceway surface 17. As a result, it is possible to suppress the grease from being severely sheared between the inner ring raceway surface 17 and the ball 13 and thus, suppress the grease from softening.

Thus, in the cage 14 of the ball bearing 10, when considering a virtual conical plane p (the virtual conical plane p is a conical surface in which the straight line k1 is a generating line) that includes the edge indicated by the point F and that is parallel to the reference virtual conical plane, at least one portion of the end portion 44 of the prong 40 on the other axial side is positioned nearer to the other axial side than the virtual conical plane p. That is, when the ball bearing 10 is viewed in the direction of the arrow X, the virtual conical plane p that includes the edge indicated by the point F and that is parallel to the reference virtual conical plane overlaps with the pocket 41. In this way, the grease stuck to the surface of the ball 13 is scraped off by the prong 40 and thus, it is possible to suppress the grease from entering the inner ring raceway surface 17.

Similarly, on the side viewed in the direction of the arrow Y, it is possible to suppress the grease from entering the outer ring raceway surface 31. In FIG. 3C, the grease in the region in which hatching is applied, of the grease stuck to the surface of the ball 13, is scraped off in a lower portion of the prong 40 of the cage 14, that is, in regions b2 to b3 and b3 to b4. FIG. 3A schematically shows the state of grease Q2 scraped off in the lower portion of the prong 40.

In the ball bearing 10 of the first embodiment, a position of a2 that is an end portion of the prong 40 on the other axial side is positioned to be nearer to the other axial side than a straight line k1 that passes through a point F (an edge at which the second outer peripheral surface 22 connects to the inner ring raceway surface 17) and that is parallel to the straight line k0. Thus, in the moving direction of the surface of the ball 13, the outer ring raceway surface 31 is always positioned rearward of the prong 40 of the cage 14. Therefore, it is possible to suppress the grease stuck to the surface of the ball 13 from entering the outer ring raceway surface 31. As a result, it is possible to suppress the grease from being severely sheared between the outer ring raceway surface 31 and the ball 13 and thus, suppress the grease from softening.

In this way, in the cage 14 of the ball bearing 10, when considering a virtual conical plane q (the virtual conical plane q is a conical surface in which the straight line k2 is a generating line) that includes the edge indicated by the point D and that is parallel to the reference virtual conical plane, at least one portion of the end portion 44 of the prong 40 on the other axial side is positioned nearer to the other axial side than the virtual conical plane q. That is, when the ball bearing 10 is viewed in the direction of the arrow Y, the virtual conical plane q that includes the edge indicated by the point D and that is parallel to the reference virtual conical plane overlaps with the pocket 41. In this way, the grease stuck to the surface of the ball 13 is scraped off by the prong 40 and thus, it is possible to suppress the grease from entering the outer ring raceway surface 31.

In the ball bearing 10 of the first embodiment, the pocket 41 overlaps with virtual conical planes that are parallel to the reference virtual conical plane and that are part of both the virtual conical plane p and the virtual conical plane q on the other axial side. The virtual conical plane p includes the edge indicated by the point F, and the virtual conical plane q includes the edge indicated by the point D. Thus, it is possible to prevent the grease stuck to the surface of the ball 13 from entering the raceway surfaces 17, 31. As a result, it is possible to suppress the grease from being severely sheared on the raceway surfaces 17, 31 and suppress the grease from softening.

In the ball bearing 10 of the first embodiment, an axial length h of the prong 40 is set appropriately. Thus, at least one portion of the prong 40 of the cage 14 overlaps with the inner ring raceway surface 17 in the axial direction and the entirety of the cage 14 do not overlap with the inner ring shoulder 26 in the axial direction. That is, the position of the end portion (a3 or b3) of the prong 40 on the other axial side is nearer to the inner ring raceway surface 17 in the axial direction than the edge indicated by the point F. A clearance in which the grease can be sheared is not formed between the cage 14 and the inner ring 11. Thus, it is possible to suppress the grease from softening.

In the first embodiment, in order to clarify the effects of appropriately setting the axial length h of the prong 40, the description will be made in comparison to the movement of the grease sealed in the conventional ball bearing 80, with reference to FIG. 5. In the conventional ball bearing 80, a cage 86 has a pair of annular bodies 91, 91 on both axial sides on the same axis, and a plurality of cage bars 92 that connect the annular bodies 91, 91 in the axial direction. A pocket (not shown) is formed between the cage bars 92 which are adjacent to each other in the circumferential direction to support a ball 85. In this way, in the conventional ball bearing 80, on the other axial side, the annular body 91 of the cage 86 is positioned radially outward of an inner ring shoulder 96, and the cage 86 and the inner ring shoulder 96 overlap in the axial direction. When the ball bearing 80 rotates, the grease sealed within flows from the one axial side to the other axial side. At this time, the grease is softened by being severely sheared between the inner periphery of the cage 86 and the inner ring shoulder 96. Thus, the grease leaks easily on the other axial side in the conventional ball bearing 80.

Since the annular body 91 of the cage 86 is provided in the conventional ball bearing 80 on the other axial side of the annular space K in the axial direction, the spatial volume corresponding to the annular body 91 decreases. Thus, at an early stage, the conventional ball bearing 80 is filled with the grease that flows to the other axial side due to centrifugal force, which makes it easier for the grease to leak.

In contrast, in the ball bearing 10 of the first embodiment, on the other axial side, the cage 14 and the inner ring shoulder 26 do not overlap in the axial direction. Even when the ball bearing 10 of the first embodiment rotates and the sealed grease flows to the other axial side of the ball 13 due to centrifugal force, the grease is not sheared between the cage 14 and the inner ring shoulder 26 on the other axial side and it is possible to suppress the grease from softening. Also, a sufficient volume can be ensured in the annular space K on the other axial side. Therefore, even if the grease flows to the other axial side due to centrifugal force, the ball bearing 10 is not filled with the grease at an early stage. Thus, in the ball bearing 10 of the first embodiment, it is possible to further effectively suppress the grease from leaking. In this way, the ball bearing 10 of the first embodiment can suppress the grease from softening and suppress the grease from leaking even when the ball bearing 10 is used for high-speed rotation.

Figure 4:
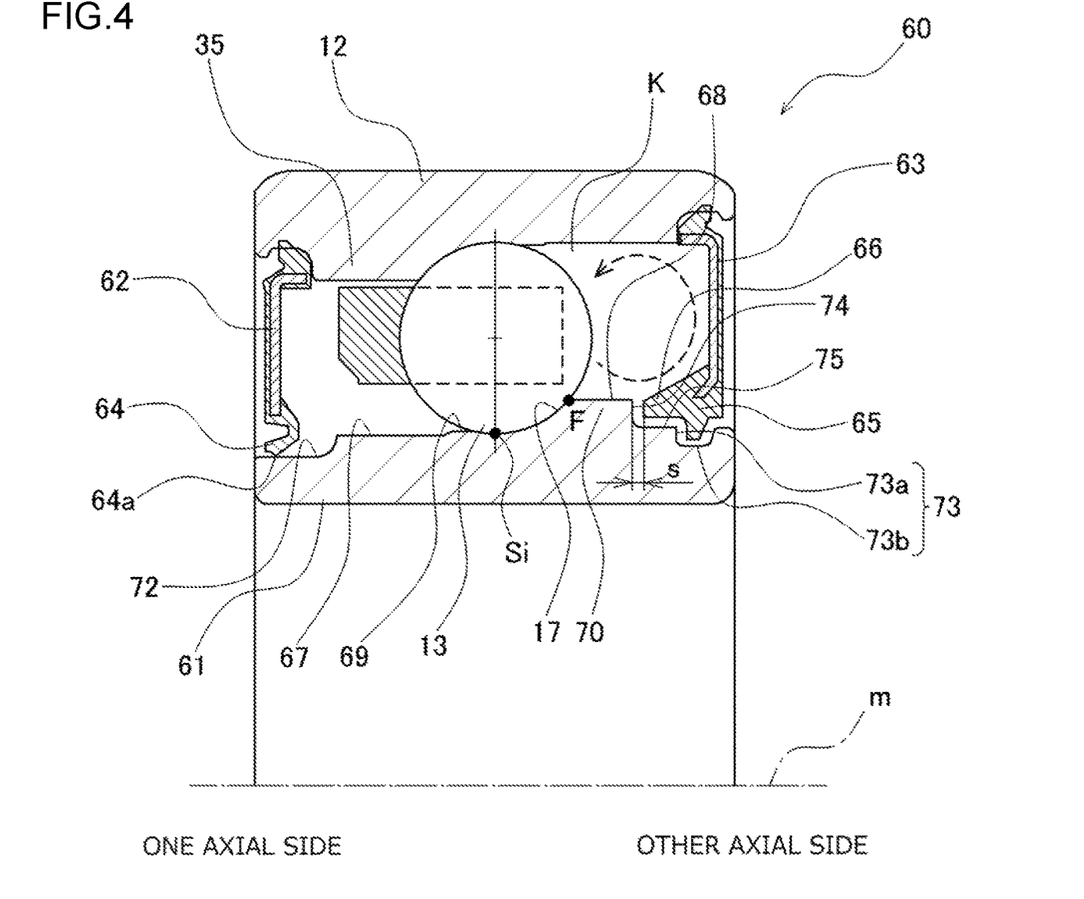
FIG. 4 is an axial sectional view of a ball bearing of the second embodiment.

A ball bearing 60 of the second embodiment will be described. FIG. 4 is an axial sectional view of the ball bearing 60. In the second embodiment, the configurations of an inner ring 61, a first sealing device 62 (one sealing device), and a second sealing device 63 (the other sealing device) are different compared to the first embodiment. The configuration of a portion on which a lip 64 of the first sealing device 62 and an outer periphery of the inner ring 61 are in contact is also different. Additionally, a portion in which a lip 65 of the second sealing device 63 and an outer periphery of the inner ring 61 combine have a different configuration. The configurations that differ will be described below. The configurations of the second embodiment which are the same as those in the first embodiment will be described with same symbols.

In the inner ring 61 of the second embodiment, the inner ring raceway surface 17 on which the ball 13 rotates is formed in the generally axial center of the outer periphery. A first outer peripheral surface 67 is formed on the one axial side of the inner ring raceway surface 17 of the outer periphery. A second outer peripheral surface 68 is formed on the other axial side of the inner ring raceway surface 17 of the outer periphery.

The first outer peripheral surface 67 is annularly formed with the bearing axis m as its center. An outer diameter of the first outer peripheral surface 67 is generally the same as the diameter of the inner ring raceway bottom Si. A retaining portion 69 is formed in a portion on the other axial side of the first outer peripheral surface 67 that is connected to the inner ring raceway surface 17. The retaining portion 69 has a slightly larger diameter than that of the inner ring raceway bottom Si, and thus the balls 13 do not easily fall out of the inner ring 61 when the ball bearing 60 is assembled. A lip contact surface 72 is formed on an outer periphery of the inner ring 61 nearer to the one axial side than the first outer peripheral surface 67. The lip contact surface 72 has a smaller diameter than the first outer peripheral surface 67, has a cylindrical shape, and is formed on the same axis as the first outer peripheral surface 67. A lip end portion 64a of an inner periphery of the lip 64 of the first sealing device 62 is in contact with the lip contact surface 72.

The second outer peripheral surface 68 is annularly formed with the bearing axis m as its center. An outer diameter of the second outer peripheral surface 68 is larger than that of the first outer peripheral surface 67. An edge at which the second outer peripheral surface 68 and the inner ring raceway surface 17 are connected is indicated by the point F in FIG. 4. A third outer peripheral surface 75 is annularly formed on the outer periphery of the inner ring 61 nearer to the other axial side than the second outer peripheral surface 68 with the bearing axis m as its center. The third outer peripheral surface 75 has a smaller diameter than the second outer peripheral surface 68, has a cylindrical shape, and is formed on the same axis as the second outer peripheral surface 68. The third outer peripheral surface 75 is connected to the second outer peripheral surface 68 through a side surface 74 extending in the radial direction. A second lip groove 73 in which the lip 65 of the second sealing device 63 is placed is formed in the third outer peripheral surface 75.

On the other axial side of the inner ring raceway surface 17, an inner ring shoulder 70 that has a larger diameter than the raceway bottom is formed and the ball 13 can be supported in the axial direction. In contrast, on the one axial side of the inner ring raceway surface 17, a shoulder is not formed and thus, the ball 13 cannot be supported in the axial direction. The portion on which the first outer peripheral surface 67 is formed and the retaining portion 69 define an "inner ring stepped portion".

The second embodiment is characterized in that the flow of the grease toward a labyrinth clearance between the second sealing device 63 and the inner ring 61 is suppressed to suppress the grease from leaking. An effect of the second embodiment is that the grease stuck to the surface of the ball 13 is suppressed from entering the raceway surfaces 17, 31 and the grease is suppressed from softening, by appropriately setting the axial length h of the prong 40. Additionally, an effect of the second embodiment is that the grease is suppressed from being sheared and softened, with the cage 14 and the inner ring shoulder 70 not overlapping in the axial direction. These effects are the same as those of the first embodiment. The description of the common effects will be omitted.

In the second embodiment, the first sealing device 62 and the second sealing device 63 are assembled to the opening portions on both axial sides of the annular space K.

Compared to the first sealing device 15 of the first embodiment, the configuration of the lip 64 of the first sealing device 62 of the second embodiment is different. In the elastic body, the lip 64 is formed radially inward of a metal core 76. The lip 64 faces the lip contact surface 72 while the lip end portion 64a is deflected in the radial direction. The lip end portion 64a of the inner periphery of the lip 64 is in contact with the lip contact surface 72 throughout the entire circumference. In this way, the first sealing device 62 is fixed to the one axial side of the outer ring counter-bored portion 35. The first sealing device 62 faces the inner ring 61 while in contact with a position on the one axial side of the inner ring stepped portion to define the annular space K from the outside space of the one axial side.

The second sealing device 63 of the second embodiment has the same configuration as the second sealing device 16 of the first embodiment. The lip 65 of the second sealing device 63 protrudes radially inward towards the second lip groove 73 and faces a groove side surface 73a of the second lip groove 73 in the axial direction while facing a groove bottom surface 73b. A portion of the lip 65 protrudes toward the one axial side to form a sub-lip 66. The sub-lip 66 faces the third outer peripheral surface 75 in the radial direction with a clearance therebetween and faces the side surface 74 in the axial direction with a clearance s therebetween. An outer diameter of an end portion on the one axial side of the sub-lip 66 is generally the same size as the outer diameter of the second outer peripheral surface 68. The lip 65 and the sub-lip 66 face the second lip groove 73, the third outer peripheral surface 75, and the side surface 74 with a slight clearance therebetween to form a labyrinth which suppresses entry of foreign matter into the annular space K.

In this way, the second sealing device 63 is fixed on the other axial side of the outer ring counter-bored portion. In this way, the second sealing device 16 is fixed to the other axial side of the outer ring counter-bored portion. The second sealing device 16 faces the inner ring 11 in a non-contact manner at a position on the other axial side of the inner ring shoulder 26 to define the annular space K from an outside space on the other axial side.

The grease flows in the annular space K in a direction indicated by a dashed line arrow in FIG. 4. In the second embodiment, the clearance s is provided between the sub-lip 66 and the side surface 74 in the radial direction, that is, in a direction generally orthogonal to the direction in which the grease flows. Thus, the grease flows towards an outer periphery of the sub-lip 66, which makes it harder for the grease to flow into the clearance s that crosses with the flowing direction of the grease. Since it becomes harder for the grease to enter the labyrinth clearance between the lip 65 and the inner ring 61 in the second embodiment, it is possible to further surely suppress the grease from leaking.

As in the first embodiment, it is possible to further effectively suppress the grease form leaking since a sufficient volume can be ensured on the other axial side of the annular space K.

In this way, in the ball bearing 60 of the second embodiment, it is possible to suppress the grease stuck to the surfaces of the balls 13 from entering the inner ring raceway surface 17 and the outer ring raceway surface 31 and suppress the grease from softening even when the ball bearing 60 is used for high-speed rotation. In the ball bearing 60 of the second embodiment, it is possible to suppress the grease form being sheared and softened since the cage 14 and the inner ring shoulder 70 do not overlap in the axial direction on the other axial side. Thus, in the ball bearing 60 of the second embodiment, it is possible to suppress the grease from leaking from the second sealing device 63 even if the grease flows towards the other axial side due to centrifugal force. Additionally, in the ball bearing 60 of the second embodiment, it is possible to further surely suppress the grease from leaking since the flow of the grease towards the labyrinth clearance between the lip 65 and the inner ring 61 on the other axial side can be suppressed.

The invention is not limited to the embodiments described above, and may be varied in other ways. For example, the lip of the second sealing device provided on the other axial side may face the inner ring while in contact with the inner ring shoulder. Other variations are possible such as switching the corresponding configurations of the first embodiment and the second embodiment.

The ball bearing of the invention can suppress softening of the grease to suppress the grease from leaking even when the ball bearing is used for high-speed rotation.

What is claimed is:
1. A ball bearing comprising:
an inner ring that has, on an outer periphery, an inner ring raceway surface, an inner ring stepped portion that is positioned on one axial side of the inner ring raceway surface and that does not have a shoulder, and a shoulder positioned on the other axial side of the inner ring raceway surface;
an outer ring that has, on an inner periphery, an outer ring raceway surface, a shoulder positioned on the one axial side of the outer ring raceway surface, and an outer ring counter-bored portion that is positioned on the other axial side of the outer ring raceway surface and that does not have a shoulder;
a plurality of balls rollably disposed between the inner ring raceway surface and the outer ring raceway surface;
a cage that has an annular body disposed on the one axial side of the balls, a plurality of prongs disposed on the other axial side of the annular body, and a pocket that is surrounded by two adjacent prongs and the annular body and that houses one of the balls;

a first sealing member that is fixed to the one axial side of the shoulder of the outer ring while facing the inner ring in a contact or a non-contact manner at a position on the one axial side of the inner ring stepped portion and/or a position offset to the one axial side from the inner ring stepped portion, and that defines a space surrounded by the outer ring and the inner ring in the radial direction from an outside space on the one axial side; and a second sealing member that is fixed to the other axial side of the outer ring counter-bored portion while facing the inner ring in a contact or a non-contact manner at a position on the other axial side of the shoulder of the inner ring and/or a position offset to the other axial side from the shoulder of the inner ring, and that defines a space surrounded by the outer ring and the inner ring in the radial direction from an outside space on the other axial side, wherein an inner ring nominal contact point, in which the inner ring raceway surface and the balls are in contact, is positioned offset to the other axial side from an outer ring nominal contact point, in which the outer ring raceway surface and the balls are in contact, at least one portion of each of the prongs overlaps with the inner ring raceway surface in the axial direction while the entirety of each of the prongs does not overlap with the shoulder of the inner ring in the axial direction, and the pocket overlaps with virtual conical planes that are parallel to a reference virtual conical plane including the inner ring nominal contact point and the outer ring nominal contact point, and that include, on the other axial side, both a virtual conical plane including an edge between the inner ring raceway surface and the shoulder of the inner ring and a virtual conical plane including an edge between the outer ring raceway surface and the outer ring counter-bored portion.

2. The ball bearing according to claim 1, wherein the second sealing member faces the inner ring in a non-contact manner at a position on the other axial side of the shoulder of the inner ring and/or at a position offset to the other axial side from the shoulder of the inner ring.

* * * * *